United States Patent [19]
Tamaura et al.

[11] Patent Number: 5,897,810
[45] Date of Patent: Apr. 27, 1999

[54] COAGULATING AGENT FOR WASTEWATER

[75] Inventors: Yutaka Tamaura, 3-17-7, Sannou, Ota-ku, Tokyo; Takashi Kiryu, Ota, both of Japan

[73] Assignees: Yutaka Tamaura; Chiiki Shinko Jigyo-dan Co., Ltd., both of Tokyo, Japan

[21] Appl. No.: 08/799,021

[22] Filed: Feb. 10, 1997

[30] Foreign Application Priority Data

Feb. 16, 1996 [JP] Japan .................................. 8-029282
Jan. 27, 1997 [JP] Japan .................................. 9-012441

[51] Int. Cl.$^6$ .................................................. C09K 3/00
[52] U.S. Cl. ............................. 252/60; 252/61; 106/772; 106/773; 210/705; 210/723
[58] Field of Search ..................... 252/60, 61; 210/705, 210/723; 106/772, 773

[56] References Cited

U.S. PATENT DOCUMENTS 4,218,316  8/1980  Watson et al. ........................ 210/727

FOREIGN PATENT DOCUMENTS

| 714855 | 6/1996 | European Pat. Off. . |
| 50110972 | 9/1975 | Japan . |
| 354118652 | 9/1979 | Japan . |
| 355127109 | 10/1980 | Japan . |
| 402268882 | 11/1990 | Japan . |
| 407136409 | 5/1995 | Japan . |
| 408173998 | 7/1996 | Japan . |
| 790217 | 8/1997 | Japan . |

OTHER PUBLICATIONS

*Environmetal Science ad Engineering* Henry et al. p. 387 Prentice Hall, Englewood Cliffs NJ, 1989.

*Primary Examiner*—Paul Marcantoni
*Attorney, Agent, or Firm*—Kanesaka & Takeuchi

[57] ABSTRACT

Shell fossil powder is added to a flocculation agent which is mainly composed of gypsum and silicate compound, and the mixture is added to a suspension. The mixing ratio of the flocculation agent and shell fossil powder is 3:1. The flocculation agent functions as a coagulation core A, and the shell fossil powder is able to absorb grains in the suspension as a carrier B and is acquired by the coagulation core A. The carrier B is a grain which is able to effectively utilize $Ca^{2+}$ flocculation site of the coagulation core A, which absorbs a great deal of suspending grains, wherein the suspending grains are acquired by the coagulation core A and form a large flock and are quickly settled.

8 Claims, 3 Drawing Sheets

FIG. 3
A / B = 1/40
(B/C = 1/1)
B / C = 1/1
A / C = 1/4

COAGULATING AGENT FOR WASTEWATER

BACKGROUND OF THE INVENTION

The present invention relates to a coagulating agent for wastewater which is used for processing such as coagulation, dehydration, purification, etc. of various kinds of waste water, sludge, contaminated silt, etc.

DESCRIPTION OF THE PRIOR ART

Industries are concentrated in specific areas, and industrial waste water has increased in line with the large expansion of the industries, and people are concentrated at cities to cause domestic waste water to be increased. Furthermore, contamination of water in rivers, lakes and ponds, and seas is increasing, due to a shortcoming of sewage systems. Thereby, source water or industrial water sources have been seriously contaminated.

With respect to treatment of waste water, although there are some trials of new processing facilities, there are still problems since it is difficult to completely understand the details of substances to be treated, and the quality of waste water and discharge quantity thereof are not able to be made constant due to the diversification thereof.

Waster water treatment apparatuses are classified as follows, in view of the processes of operation units thereof. They are 1) physical treatment process (screening process, settlement process, sedimentation process, filtration process, floating process, etc.), 2) chemical treatment process (neutralization process, oxidization and reduction process, flocculation process, etc.) and 3) biochemical treatment process (activated-sludge process, trickling filter process, methane fermentation process, etc.).

As an operation unit, a physical treatment process is a method for physically separating solids from liquids, a settlement process is in the main stream of separation operations in waste water treatment, and the same is one of the simplest methods among the physical treatment processes. There are two processes in the settlement separation process, one of which is a natural settlement process, and the other of which is a flocculation process. The flocculation process is such that fine grains in water which can not be settled by the natural settlement process in an economical time are agitated while adding flocculation agents thereto to cause their flocks to be produced, whereby fine grains are coupled to each other and coagulated to be large grains, thereby causing the settlement efficiency to be accelerated. Various kinds of water-soluble inorganic substances or organic substances may be used as a flocculation agent. The inorganic substances may generally be salts having a low molecular weight, and the actions of aluminum salts and ferro salts around the neutral are just like those of polymers of low degree. The main organic substances are water-soluble high molecular weight substances.

The process of flocculation settlement treatment of water mainly consists of three processes:

i) Flocculating process where a flocculation agent flocculates suspending substances and minute flocks are generated.

ii) Flock forming process where minute flocks are brought into collision or contact with each other and greater flocks are gradually produced.

iii) Settlement separation process where large flocks generated in the flock forming process are separated from water.

Since the above-mentioned three processes are generally carried out in apparatuses which are separated from each other, it takes a long time to separate solid grain flocks from a suspension and to concentrate the same by a flocculation and settlement process. As an equipment which is able to perform these three processes, there are quick flocculation and settlement apparatuses, and one of them is a slurry circulation type having a feature that flocks can be made to such a degree that they can be settled, wherein highly concentrated slurry already generated is flocculated and circulated to the flock forming process to promote the flock formation from minute flocks to large flocks. Although the settlement and separation rate of the quick flocculation and settlement apparatus depends on the quality of source water, it is usually designed that the rate is 2 to 3 m per hour and the staying duration of time is 50 to 70 minutes (Refer to Shohin Daijiten=Product Dictionary, published by Toyo Keizai Sinposha, 1976, Pages 512 to 516).

In any case, although the settlement separation constitutes the main stream of separation operations in the waste water treatment, the quick separation is carried out mainly by improving the flocculation settlement treatment mechanism, and there is a limit to the settlement separation rate. Therefore, it has not been considered that it would be possible to quickly form large sized flocks by improving the flocculation function of the flocculation agents.

OBJECT AND SUMMARY OF THE INVENTION

It is therefore an object of the invention to provide a coagulating agent by which solid-liquid separation is made easy and it is possible to achieve a purification of the water to be treated.

It is another object of the invention to provide a coagulating agent which is able to complete the coagulation and settlement of grains in a short time without any need to adjust pH.

It is still another object of the invention to provide a agent which is able to precipitate grains by immediately forming large-sized flocks without passing through a flocculation process in which small-sized grains are formed.

It is a further object of the invention to provide a coagulating agent which is able to remarkably increase the flocculation effects of solid grain flocks in a suspension, wherein a specified flocculation agent is caused to acquire a certain kind of constituent as a carrier and the flocculation site which the carrier has is effectively utilized.

The present invention is able to be widely used for treatment of waste water produced in the process of crushing stones, gravels, preventing red clay from flowing out, treatment of contaminated silt, treatment of waste water generated by tunnel construction works, dehydration of activated sludge, flocculation and dehydration of domestic waste water, and flocculation or dehydration of industrial waste water, etc.

A coagulating agent according to the invention is a mixture of a coagulation core and carrier.

(1) Coagulation core A

In the invention, a flocculant used for the coagulation core is a white powder having anhydrous gypsum, absolute gypsum and silica, wherein $CaSO_4$ (soluble absolute gypsum) and $CaSO_4 \cdot 2H_2O$ (anhydrous gypsum) are detected in accordance with the results of X-ray diffraction, and the composition ratio of constituent elements detected by the qualitative analysis (EPMA) is as shown in Table 1.

TABLE 1

| Elements | Element ratio (w %) |
|---|---|
| Ca | 57.68 |
| S | 37.63 |
| Si | 3.39 |
| Al | 1.30 |

Judging from the results of Table 1, it is recognized that this flocculant includes absolute gypsum, gypsum dihydrate as main crystalline constituents and amorphous constituents such as sodium silicate, etc. which becomes water glass if the same is dissolved in water. As a flocculant which is suitable for these conditions, there is a kind of fly ash, for example, a hydrophobic flocculant for treating sludge (Trade name: Water Mate) made by Chiiki Shinko Jigyodan Co., Ltd. In this invention, this flocculant is used for a coagulation core A.

(2) Carrier B

A preferable carrier B used in the invention is a fine powder, generally so called shell fossils. The shell fossils are shell fossil ores mined from the ancient shell fossil layer. Although the main constituent thereof is calcium carbonate, they include a little bit of magnesium oxide (MgO) and ferric oxide ($Fe_2O_3$) and further include various kinds of constituents. Differing from usual shells, the finely ground shell fossils are porous, and their surface area is large, whereby the adsorption force thereof is strong. One-fifth of the adsorption force of the activated charcoal of the same capacity can be obtained.

Calcium carbonate which is the main constituent is easily soluble in water, and about 10 times more soluble than calcite. Especially, calcium carbonate is much more soluble in water including carbon dioxide ($CO_2$). The shell fossil ores used as a material of the carrier are those mined from the shell fossil layer. The shell fossil layer is such that at the middle term of the Neogene (about 12,000,000 years ago) sea shells, etc., especially, bivalves, snails, and skeletons or remains of sea organisms, etc. are concentrated, buried and accumulated, solidified to be granular or mesh-like due to high temperatures in line with the underground high pressure, and finally appear on the ground. The mined shell fossil ores are finely crushed, in which silicate constituents included in shell fossils are washed off and eliminated with water. According to the results of the qualitative analysis (EPMA) of the acquired shell fossils powder, the composition ratio of the constituent elements is as shown in Table 2.

TABLE 2

| Elements | Element ratio (w %) |
|---|---|
| Ca | 40.16 |
| Si | 35.11 |
| Al | 10.34 |
| Fe | 6.77 |
| Mg | 4.61 |
| K | 3.01 |

The carrier B is not necessarily limited to shell fossil power. BAKUHAN stone is also available as the carrier B, which is able to be bring us the same effects.

Although the content of calcium in the chemical composition of the BAKUHAN stone is very different from that of shell fossils, there are common points between them as carriers since it is said that the features of the BAKUHAN stone are as follows:

(a) be porous, (b) has a strong adsorption force, (c) melts out minerals, (d) adjusts the water quality, and (e) increases the remaining oxygen content.

If so, there is a high possibility for some kinds of ceramics to be utilized as carrier B.

(3) Composition ratio between the coagulation core A and carrier B

In a case where a flocculant is used as a coagulation core A and shell fossil powder is used as a carrier B, a preferable mixture ratio between them is A:B=3:1. Therefore, the composition ratio of the constituent elements is as shown in Table 3.

TABLE 3

| Elements | Element ratio (w %) |
|---|---|
| Ca | 44.54 |
| Si | 27.18 |
| S | 9.41 |
| Al | 8.08 |
| Fe | 5.08 |
| Mg | 3.46 |
| K | 2.25 |

The preferable mixture ratio between the coagulation core A and the carrier B in the embodiment is established on the basis of the experiment of an embodiment described below.

BRIEF DESCRIPTION OF THE DRAWINGS

FIG. 3 is a view showing a flock forming mechanism by a coagulating agent according to the invention.

DETAILED DESCRIPTION OF THE PREFERRED EMBODIMENTS

A description is given below of preferred embodiments of the invention.

Figure 1:
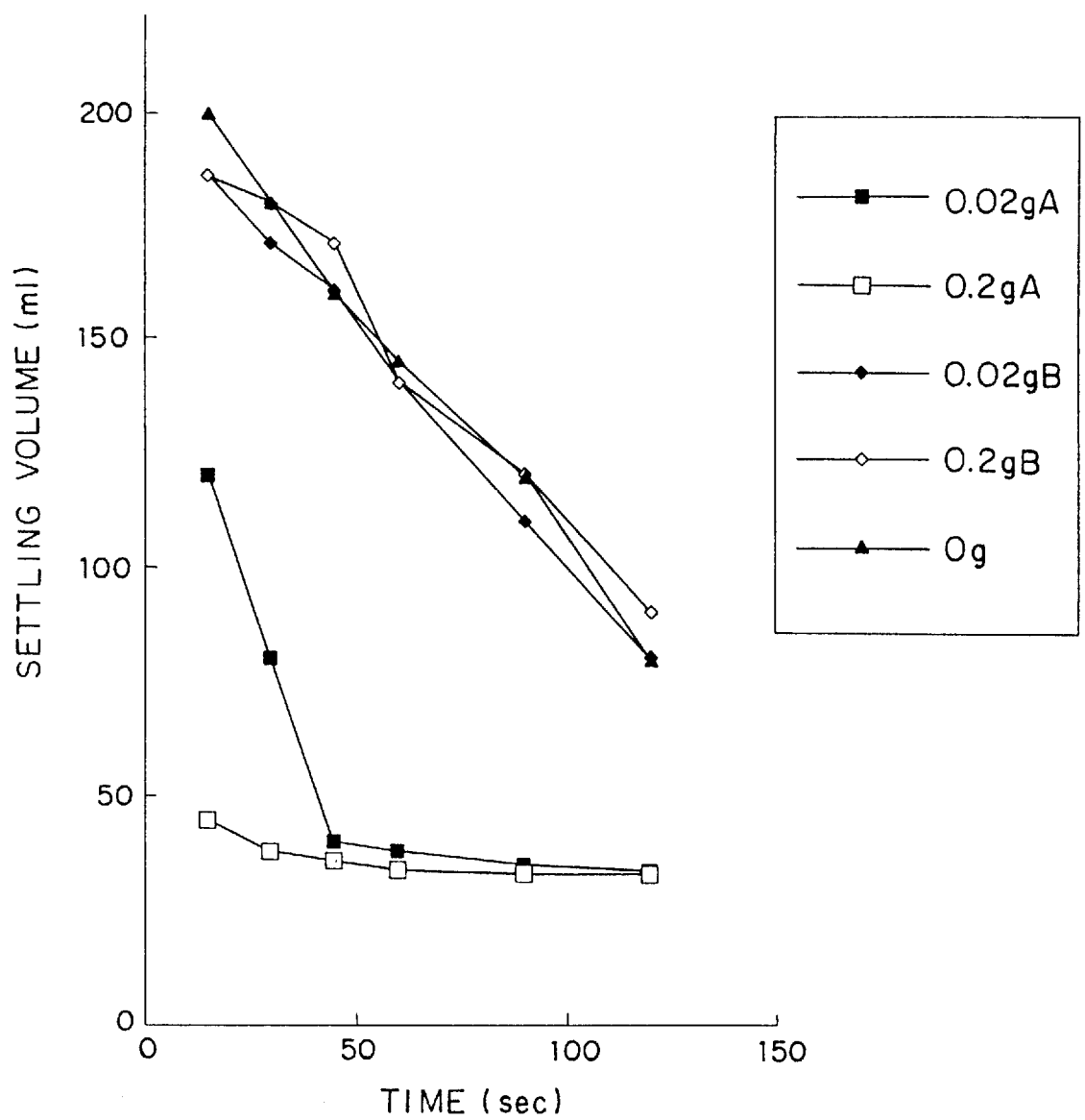
FIG. 1 is a view showing the settlement characteristics of Okinawa red clay in a case where a flocculation agent and shell fossils are separately used.

FIG. 1 shows the measurement of flocculation and settlement of a suspension in a case where a flocculant (hereinafter called "A") used for the coagulation core A and shell fossil power (hereinafter called "B") used as a carrier B are separately used. The suspension is prepared by adding two grams of Okinawa red clay to 100 milliliters of water. The settlement rate of grains in the suspension was measured with 0.02 grams of A and 0.2 grams of B respectively added to the suspension. In the drawing, O gram shown with ▲ is a case where no A or B is added, that is, the same shows the natural settlement rate of the suspended grains. As has been made clear in FIG. 1, although the more the adding volume of A is increased, the quicker the flocculation and settlement effects becomes, it is understood that B has almost no flocculation or settlement effect.

Figure 2:
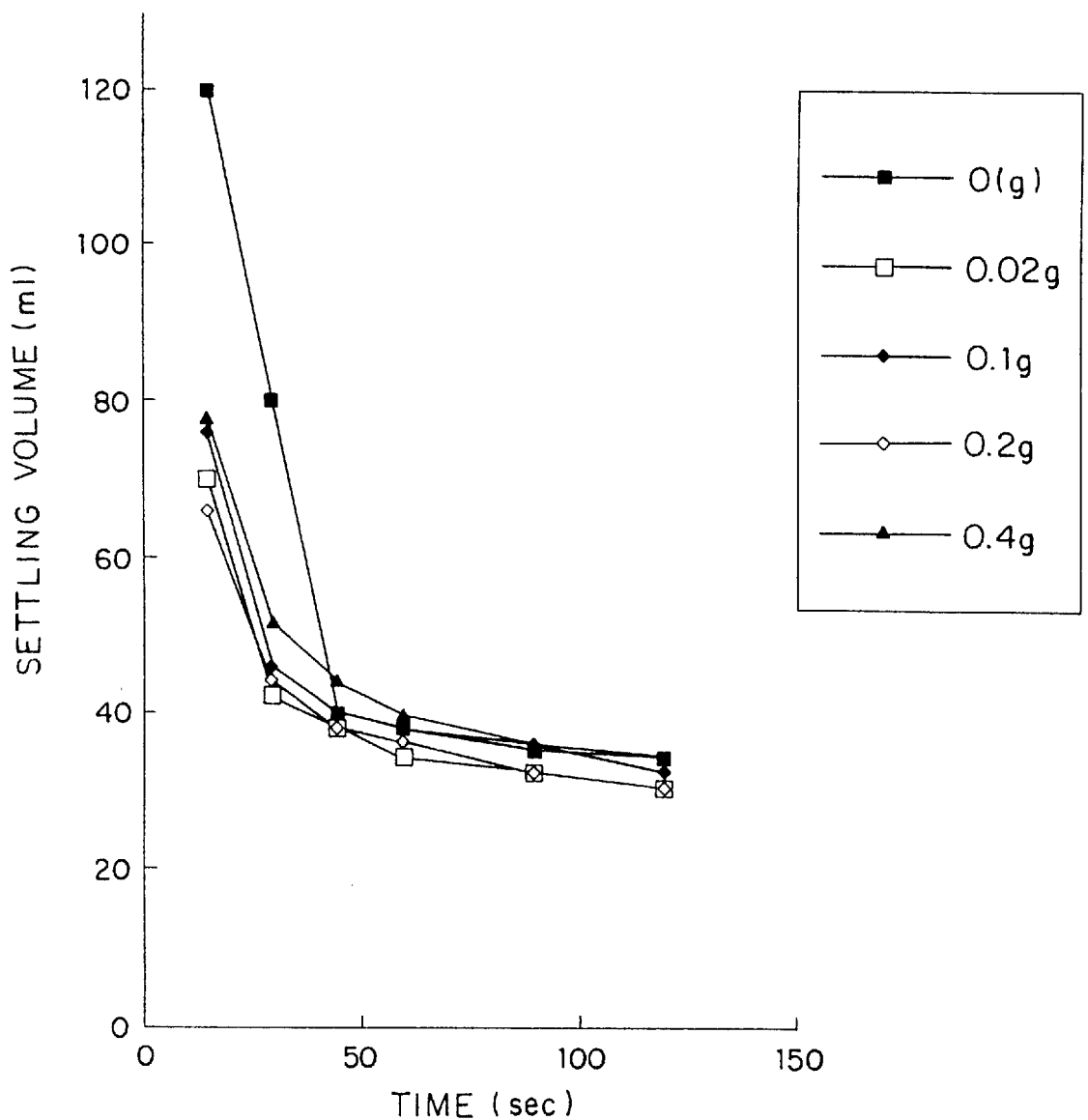
FIG. 2 is a view showing the settlement characteristics of Okinawa red clay in a case where the mixture of the flocculation agent and shell fossils is used.

FIG. 2 is a view showing the settlement rate when A and B are added to the suspension at the same time while changing the adding quantity of B in the range from 0.02 grams to 0.4 grams with the added A kept constant (at 0.02 grams).

As has been made clear in FIG. 2, it is found that when B is added, the settlement rate is remarkably increased in comparison with the settlement rate with only A. However, the settlement rate is not necessarily increased in proportion to an increase of the added volume of B. In this experiment, it is found that, when the added volume of A is 0.02 grams, the settlement rate in a case where 0.02 grams of B is added is almost the same as that in a case where 0.2 grams of B is added. However, it is found that, when the measurement is carried out with the reaction capacity set to five times while the adding volume of B is strictly and accurately controlled, the effective mixture ratio is A:B=3:1.

EXPERIMENT OF FLOCCULATION AND SETTLEMENT (Experiment 1)

Two grams of Okinawa red clay C (hereinafter called "C") is added to 100 milliliters of water and is suspended therein. 50 milligrams of A and 150 milligrams of B are added to this suspension in the combination shown in Table 2. The $Ca^{2+}$ concentration of the supernatant fluid was measured by atomic absorption spectroscopy (AAS).

The quantity of $Ca^{2+}$ which was absorbed in the flocculating settlement process was calculated from the difference between the independent $Ca^{2+}$ and the remaining quantity of $Ca^{2+}$. It was found that the more the quantity of the $Ca^{2+}$ absorbed becomes the greater the effect of the flocculating settlement was. The results thereof are shown in Table 4.

TABLE 4

| Combination of test materials | Absorbed quantity of $Ca^{2+}$ |
|---|---|
| BC | 0.082 |
| AC | 0.33 |
| AB | 3.8 |
| BC + A | 0.80 |
| AC + B | 0.26 |
| C + AB | 0.19 |

(Experiment 2)

A mixture which is obtained by mixing A and B at a ratio of 3:1 is further mixed with aluminium sulfate at a ratio of 10:1 (weight percent). The composition ratio of the constituents of the mixture is shown in Table 5.

TABLE 5

| Elements | Element ratio (w %) |
|---|---|
| Ca | 38.2 |
| Si | 21.4 |
| S | 8.0 |
| Al | 24.0 |
| Fe | 4.1 |
| Mg | 2.4 |
| K | 1.9 |

Two grams of Okinawa red clay (C) is added to 100 milliliters of water and is suspended therein. 100 milligrams of the above-mentioned mixture is added to this suspension, and the settlement rate of the suspended grains was measured. The result thereof was almost the same as that of the mark □ (0.02 grams). in FIG. 2. However, it was recognized that the flocks in this case becomes greater in comparison with the case where no aluminium sulfate is added. Furthermore, the dewaterability of the flocks was increased, whereby it was found that, by only adding a little bit of aluminium sulfate, the flock forming mechanism was further improved. This result is able to be obtained with a high molecular flocculating agent.

CONSIDERATION OF THE RESULTS

In the above-mentioned experiment 1, the absorbed quantity of $Ca^{2+}$ per milligram of A and B is 0.082 mg for BC and is 0.33 for AC in the combinations of BC and AC. That is, it was found that, since the absorbed quantity of AC is 0.33, the same has four or more times the flocculation sites of BC. Therefore, the flocculation agent has nearly four times the flocculation sites of the shell fossil powder for $Ca^{2+}$.

On the other hand, with respect to the same quantity of C or B, the absorbed quantity of $Ca^{2+}$ per milligram of A is 0.33 for C and is 3.8 for B in the comparison of AC or AB. It is found that the $Ca^{2+}$ flocculation site has ten times. That is, although only one site of many sites which A has can be used, ten sites thereof will be able to be used for B. Thus, since it can be considered that many flocculation sites where grains are linked with each other via $Ca^{2+}$ exist on the surface of B and A, it is possible to explain the results of the experiments of the above-mentioned flocculating settlement without any difficulty. This means that, if the target suspending grains C (suspending grains of Okinawa red clay) are acquired by B, many acquired C act just like B, whereby $Ca^{2+}$ flocculation site of A can be effectively utilized, and the flocculation effects of the suspending grains will be increased.

If the comparisons of the three combinations of BC+A, AC+B, and C+AB are carried out when the three elements A, B and C are mixed, the $Ca^{2+}$ absorbed quantity is 0.8 mg for BC+A, 0.26 mg for AC+B and 0.19 mg for C+AB. Therefore, the above description is given without any confliction, judging from the result saying that more $Ca^{2+}$ flocculation sites (four times) are utilized the combination of BC+A.

As an example, FIG. 3 shows a mechanism by which huge flocks are formed by making the carrier B acquire the suspending grains C (B/C=1/1) and making the coagulation cores A acquire the carrier B (A/B=1/40, B/C=1/1). As a reference, the drawing also shows an example in which A acquires C (A/C=1/4) and an example in which B acquires C (B/C=1/1).

Therefore, if the carrier B is acquired as a flocculation agent A, a great deal of suspended grains C absorbed in the carrier B are acquired by the flocculant, and furthermore since the carrier B and suspending grains C are acquired by a plurality of coagulation cores A at the same time, huge flocks are able to be quickly formed without experiencing any flocculation process in which minute flocks are generated, and are able to be settled.

In the present invention, when calcium sulfate is used for coagulation cores, calcium sulfate can be linked with the suspended grains, whereby $Ca^{2+}$ suspended grain links are formed. Since the number of links is determined by the hypothetical $Ca^{2+}$ adsorption sites and adsorption equilibrium, it is possible to presume the number of links by adding calcium sulfate, the quantity of which is less than the solubility, to the liquid to be treated, and analyzing the quantity of calcium in the supernatant liquid after the reaction is finished. Actually, in a case where calcium sulfate is used as a flocculant, since calcium sulfate the quantity of which is less than their solubility is added, it is possible to check the flocculation effects under the actual use conditions with the hypothetical number of $Ca^{2+}$ adsorption sites. Calcium sulfate is characterized in that the flocculation sites of suspended grains are caused to act as adsorption sites of $Ca^{2+}$.

As described above, in the preferred embodiment of the invention, a description is given of the case where a flocculation agent is used as coagulation cores and shell fossil powder is used as a carrier. However, the embodiment is not limited to this combination. If a flocculant includes calcium sulfate (gypsum) and any of diatomaceous earth since the flocculant is gypsum and silicate compound, there is a possibility for any kind of flocculant to be used for coagulation cores in which shell fossils are used as a carrier. It is needless to say that the carrier is not limited to shell fossils. However, a material, in which suspended grains acquired with respect to the flocculant used as coagulation cores act as a carrier just like shell fossils for the flocculant and $Ca^{2+}$ flocculation sites of coagulation cores are effectively utilized to increase the flocculation effect, must be chosen. Although BAKUHAN stones have a function as a carrier when the flocculant is used for coagulation cores as described above, there is a possibility for ceramics to be used to some degree in addition thereto.

Flocculant (for example, Trade name: Water Mate, Clearnite sold by Chiiki Shinko Jigyodan Co., Ltd.) (hereinafter called calcium sulfate based inorganic flocculant) which includes the above-mentioned absolute gypsum, gypsum dihydrate and further non-crystalline or amorphous constituents which will be dissolved in water and become water glass has functions as a coagulation core and a carrier as it is. It can be considered to be a mixture of the coagulation cores and carriers referred to in the invention. Therefore, when the above-mentioned calcium sulfate based inorganic flocculant is used, it is not necessary to add any carrier separately. Actually, "non-crystalline constituents which are dissolved in water and become water glass" contained in the above-mentioned flocculant themselves have some $Ca^{2+}$ adsorption sites, whereby non-crystalline water glass is flocculated in water. This flocculation reaction can be explained by taking into consideration that the carriers which absorb suspended grains are acquired by the coagulation cores.

A coagulating agent according to the invention is able to obtain the effects similar to the above with the adding quantity of the coagulating agent reduced by further adding aluminium sulfate or high molecular flocculant to a mixture of coagulation cores and carriers as in the experiment 2. Furthermore, in treating waste water including pigments, diatomaceous earth and activated charcoal are concurrently used, which are able to adsorb these pigments.

Suspended grains to be settled are not limited to Okinawa red clay. It is possible to coagulate and settle grains in every kind of suspension in a short time by only adding a coagulating agent according to the invention without any need to adjust the pH. Since the flocculation force of settled substances by the coagulating agent is intensive, they are not likely to be separated. Therefore, it is easy to separate grains from liquid, and water to be treated can be purified.

What is claimed is:

1. A coagulating agent for wastewater treatment comprising:

a flocculant forming coagulation cores having first flocculation sites for capturing grains contained in wastewater, said coagulation cores including crystalline gypsum and gypsum dihydrate, and carriers formed of a porous powder containing calcium carbonate, said carriers being captured in the first flocculation sites of the coagulation cores and having second flocculation sites for capturing grains contained in wastewater, a number of the first flocculation sites for absorbing the carriers being greater than a number of the first flocculation sites for absorbing the grains, the coagulation cores and the carriers being mixed in a ratio of 3:1.

2. A coagulating agent according to claim 1, wherein said first flocculation sites are $Ca^{2+}$ flocculation sites.

3. A coagulating agent according to claim 2, wherein said carriers contain amorphous constituents dissolved in water and become water glass.

4. A coagulating agent according to claim 3, wherein said carriers are granular shell fossil.

5. A coagulating agent according to claim 4, wherein the number of the first flocculation sites for absorbing the carriers is ten times greater than the number of the first flocculation sites for absorbing the grains.

6. A coagulating agent according to claim 4, further comprising aluminum sulfate to improve flock forming mechanism.

7. A coagulating agent for wastewater treatment comprising, a flocculation agent including gypsum, and shell fossil powder in a mixing ratio of 3:1, said flocculation agent and shell fossil powder being united together and capturing grains contained in wastewater.

8. A coagulating agent according to claim 7, wherein said flocculation agent captures the shell fossil powder and the grains contained in wastewater, and the shell fossil powder absorbing the grains in wastewater.

* * * * *